E. HUNTINGTON.
Velocipede.

Patented May 25, 1869.

Witnesses

Inventor

E. HUNTINGTON.
Velocipede.

Patented May 25, 1869.

Witnesses:

Inventor
Elon Huntington
by Prindle & Dyer, Attys.

United States Patent Office.

ELON HUNTINGTON, OF NEW YORK, N. Y.

Letters Patent No. 90,546, dated May 25, 1869.

---

IMPROVEMENT IN VELOCIPEDES.

---

The Schedule referred to in these Letters Patent and making part of the same.

---

*To all whom it may concern:*

Be it known that I, ELON HUNTINGTON, of New York, in the county of New York, and in the State of New York, have invented certain new and useful Improvements in the Construction and Operation of Velocipedes; and do hereby declare that the following is a full, clear, and exact description thereof, reference being had to the accompanying drawings, making a part of this specification, in which—

Letters of like name and kind refer to like parts in each of the figures.

Figure 1:
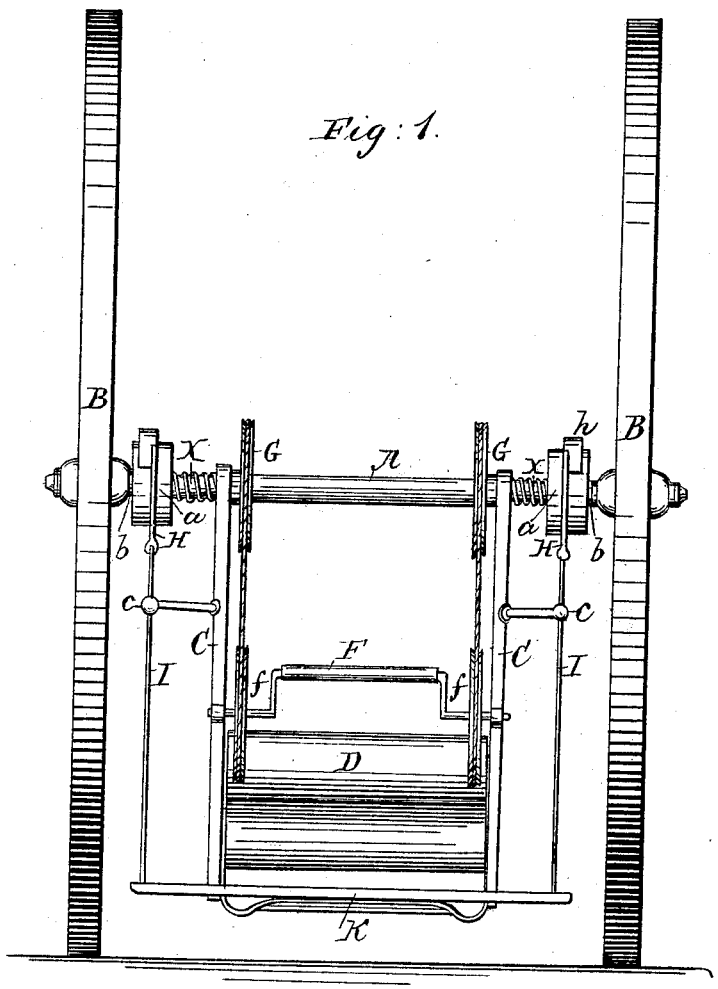
Figure 1 is a front elevation.
Figure 2:
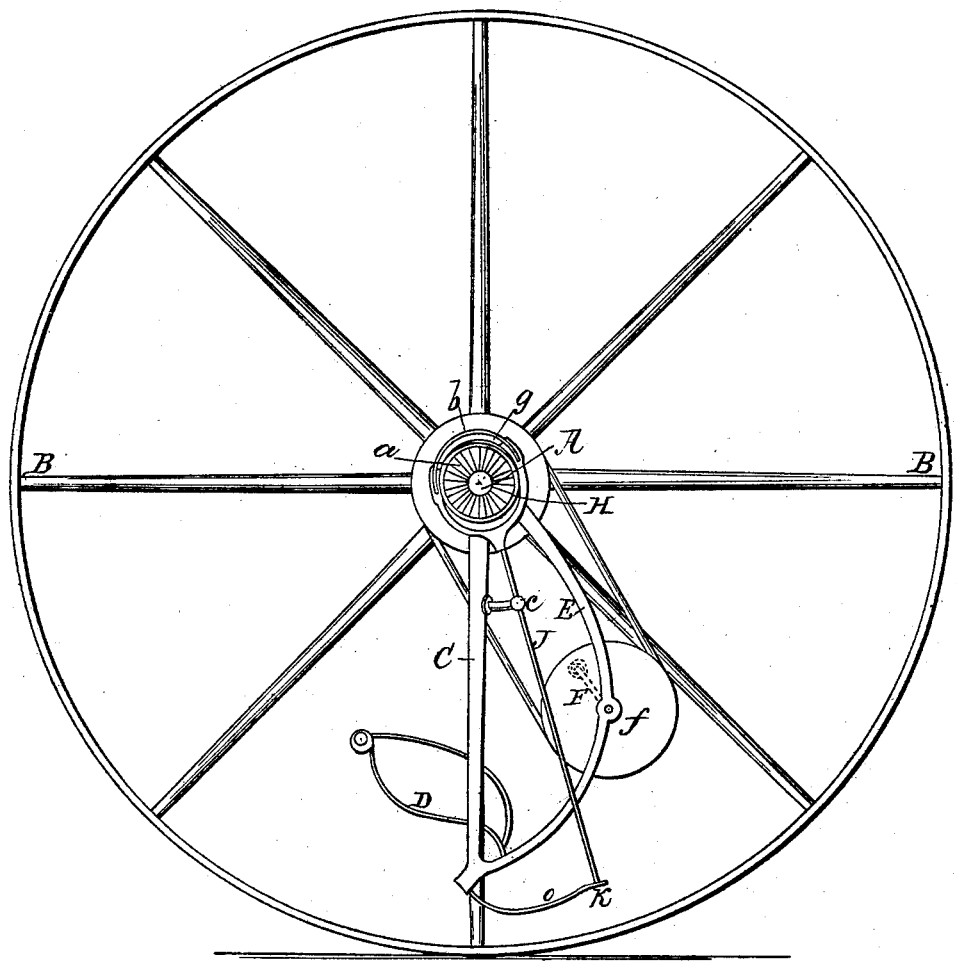
Figure 2 is a side elevation, with one wheel removed.
Figure 3:
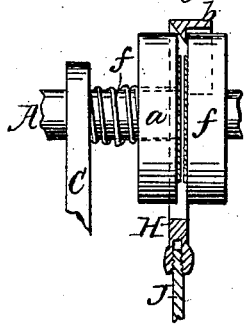
Figure 3 is an enlarged view of the clutch, with a portion of the brake broken away.

My invention relates to a class of two-wheeled velocipedes, in which the wheels are attached to opposite ends of an axle, from or upon which the body is suspended; and It consists in suspending said body entirely beneath the axle, and in providing a crank-shaft working in bearings parallel to said axle, and in convenient reach of the operator, by means of which, and through suitable pulleys secured to said shaft and axle, and connected by cords, motion is imparted to said axle, and through it to the wheels.

It also consists in the employment and construction of clutches, secured to the axle, so as to revolve with it, and, at the same time, have a lateral motion thereon, which engage with the inner face of the hubs of the wheels, which are pivoted loosely upon said axle, by means of which, when caused to engage with suitable teeth upon said hubs, said axle and wheels may both or either be connected together.

It also consists in the means employed for removing the clutch from engagement with the hub, and for braking the speed of either wheel independent of the other, for the purpose of checking or stopping the speed of the velocipede or for turning or guiding the same.

In the annexed drawing—

A represents an axle, having pivoted loosely upon its outer ends two wheels B B.

Secured to the inner end of each hub, or forming a part thereof, is a collar, $b$, the inner face of which is provided with a series of teeth, extending radially from its centre, the points of which rake backward, so as to engage with corresponding teeth raking forward upon the face of a clutch, $a$, which is secured to the axle A, so as to revolve therewith.

The clutch $a$ is so attached to the axle as to permit it to slide laterally thereon, and is caused to engage with the collar $b$, by means of a spiral spring, $x$, pressing against its inner face, except when the wheel is revolved backward, or the clutch is pressed backward by means of a device, which will be hereinafter described.

C C represent two supports, suspended vertically from the axle A, having secured near their lower ends a seat, D, for the use of the operator.

Each support is strengthened by means of a brace, E, which is secured to the upper and lower ends thereof, and bows outward to the front.

The brace E also furnishes bearings for a crank-shaft, F, placed parallel with the axle, and having upon each end a grooved pulley, $f$, corresponding with a similar pulley, G, secured to the axle, which pulleys are connected together by means of cords or other equivalent devices, so that when said shaft E is caused to revolve, motion is communicated to the axle, and through it to the wheel.

In order that the wheels may be detached from the axle, so as to guide the velocipede, a band, H, is made to encircle the collar $b$ and clutch $a$, at their point of engagement. Said band is slightly larger in diameter than said collar and clutch, and the inner face of its upper half is bevelled downward and outward, while the outer face is vertical, so as to produce a wedge-shaped edge, which, when said band is pressed downward, separates said clutch from said collar, and allows the wheel to revolve independent of the axle.

Upon the upper side or edge of said band is a strip of metal, $h$, projecting over the collar $b$, and extending about one-half of the distance around its circumference, forming a brake-shoe, so that when said band shall be sufficiently depressed, said shoe shall rest upon said collar, and retard the motion of the wheel.

Rubber, wood, or any material desired, may be applied between the shoes and collar, for the purpose of increasing their durability or increasing the friction.

Attached to the lower side of each band, H, is a rod, I, which, passing through a guide, $c$, projecting from the support C, is secured, at its lower end, to a cross-bar, K, within convenient reach of the feet of the operator, so that, by pressing downward upon said bar, he can release either or both clutches from engagement with the collar and wheels, and also by increasing the pressure, he can apply the brake-shoe to the surface of the collar, and check the motion of the wheel.

This arrangement enables said operator to guide the velocipede with great ease and certainty, as, by retarding the speed of either wheel, the other, having its speed undiminished, runs ahead, or, if the first wheel be stopped, the latter will travel, in a circle, around it.

This construction of a velocipede renders the use of large wheels practicable, and overcomes many objections hitherto existing in regard to such a means of locomotion.

It is designed to use with this device wheels from nine to twelve feet diameter, and it will be easily seen, that when constructed of such size, they will readily pass over obstructions, which would much retard or entirely stop wheels of the size ordinarily used.

The operation of this device is so simple and easy, as to render it desirable for both sexes, and for children's use.

The operator seats himself, with his feet on the supports, immediately in rear of the cross-bar, for operating the brake, or upon said cross-bar, and with his hands turns the crank, and communicates motion to the wheels.

If he desires to turn to the right or left, he has only to press his foot upon the brake-bar, and throw the wheel, upon the side to which he wishes to turn, out of engagement with the axle, when the opposite wheel, continuing to be driven forward, runs ahead and curves towards the disconnected wheel.

Should it be desired to turn more rapidly, the brake may be applied to the disconnected wheel, so as to partly or entirely arrest its motion, in which latter event, the other wheel will describe a circle around the former, which will act as a pivot.

If it is desired to arrest the motion of the velocipede, an application of both brakes will speedily accomplish such result.

Having thus fully set forth the nature and merits of my invention,

What I claim as new, and desire to secure by Letters Patent, is—

In combination with a body suspended beneath the axle, the means employed for actuating the wheels, consisting of the crank-shaft F, and pulleys $ff$ and G G, connected by means of cords, or their equivalents, substantially as shown and described.

Also, the combination and arrangement of the collars $b\ b$, and clutches $a\ a$, substantially as and for the purpose shown.

Also, the means employed for disengaging the clutches from the collars, consisting of the bands H H, constructed and operating substantially as described.

Also, in combination with the disengaging-devices above mentioned, the brake-shoes $h\ h$, constructed substantially as described, and operated by the brake-beam K and rods I I, as and for the purpose shown.

In testimony that I claim the foregoing, I have hereunto set my hand, this 4th day of May, 1869.

ELON HUNTINGTON.

Witnesses:
GEO. S. PRINDLE,
EDM. F. BROWN.